United States Patent [19]

Gamboni

[11] Patent Number: 5,001,913
[45] Date of Patent: Mar. 26, 1991

[54] AUTOMOTIVE, ANTI-THEFT DEVICE FOR BRAKES

[76] Inventor: David W. Gamboni, 613 Roosevelt Ave., Rome, N.Y. 13440

[21] Appl. No.: 522,224

[22] Filed: May 11, 1990

[51] Int. Cl.⁵ .............................................. B60R 25/08
[52] U.S. Cl. ...................................... 70/202; 70/237; 70/254
[58] Field of Search ........................ 70/237, 200–203, 70/DIG. 9, 253–257; 188/265

[56] References Cited

U.S. PATENT DOCUMENTS

| | | | |
|---|---|---|---|
| 1,260,918 | 3/1918 | Lampson | 70/254 |
| 1,967,151 | 7/1934 | Lustick | 70/202 |
| 2,232,790 | 2/1941 | Kress | 188/265 |
| 3,929,033 | 12/1975 | Marx | 188/265 X |

FOREIGN PATENT DOCUMENTS

| | | | |
|---|---|---|---|
| 460384 | 10/1949 | Canada | 70/202 |
| 2850699 | 5/1979 | Fed. Rep. of Germany | 70/202 |
| 906503 | 5/1945 | France | 70/202 |
| 54940 | 11/1950 | France | 70/201 |
| 981036 | 1/1965 | United Kingdom | 188/265 |

Primary Examiner—Lloyd A. Gall
Attorney, Agent, or Firm—Wall and Roehrig

[57] ABSTRACT

An automotive anti-theft device holds the brakes of the vehicle locked when the vehicle is parked, but does not interfere with the operation of the brakes when the vehicle is in operation. A locking bar is welded onto the brake pedal lever and extends towards the firewall. A locking post protrudes lateralyl from a free end of a bar. A locking mechanism is fixed onto the firewall to receive the locking bar when the brake pedal lever is fully depressed. The locking mechanism is contained in a heavy duty enclosure and has at least one pair of spring loaded locking jaws that are rotatably mounted within the enclosure and are positioned to engage and capture the post on the locking bar. A ratchet member is selectively actuable between unlock and lock positions. A lock cylinder is mounted in the dash and is key lockable in first and second positions that correspond to the open and closed position of the locking mechanism. A linkage mechanically connects the lock cylinder with the lock mechanism ratchet, and has a casing over the linkage between the cylinder and the locking mechanism to prevent tampering.

11 Claims, 2 Drawing Sheets

AUTOMOTIVE, ANTI-THEFT DEVICE FOR BRAKES

BACKGROUND OF THE INVENTION

This invention is directed to an automotive security system, and is more particularly directed to an anti-theft device that holds a vehicle's brakes locked when the vehicle is parked, but does not interfere with normal use of the brakes while driving.

Because of the widespread occurrence of car thefts, a number of automotive security devices have been proposed for inhibiting unauthorized use of the automobile. All modern vehicles now have an ignition lock that locks the steering column when the key is removed. However, steering column locks deter only the casual thief and can be defeated in a few seconds by a professional thief. Other automotive locking systems that have been proposed include locking gas line shut-offs, and locking ignition system interrupters. These systems are also easy for the professional thief to defeat. Moreover, they provide no security from the professional thief who may simply tow the vehicle.

One typical security device that has been proposed recently has been described in U.S. Pat. No. 4,615,192. That system locks both the parking brakes and the service brakes by pulling up on a handle that is attached to the steering column. However, as this arrangement appears directly behind the steering column, its presence is obvious to any professional car thief and, therefore, can be easily defeated.

OBJECTS AND SUMMARY OF THE INVENTION

Accordingly, it is an object of this invention to provide a simple and straightforward automotive security device that avoids the drawbacks of the prior art.

It is a more particular object of this invention to provide an anti-theft device that holds the brakes in a locked condition when the car is parked, but does not interfere with normal use of the brakes while driving.

It is a still further object of this invention to provide a lock mechanism which is positioned entirely behind the dash an on a semi-concealed part of the firewall, so that its presence will not be easily noticed.

According to an aspect of this invention, the brake locking mechanism has three main parts, namely a lock mechanism that attaches to the firewall below the dash, a lock arm that is securely affixed onto the brake pedal lever and locks into the lock mechanism, and a linkage that is controlled by a lock cylinder on the under side of the dash to put the lock mechanism into a lock (secure) or release (drive) condition. The lock mechanism preferably has four latch members, that is, an upper and a lower latch member on each of the right and left sides. These hold two lock posts and buttons that project to the left and right sides from the free end of the lock arm. The linkage has a rod or bar that extends from the lock cylinder to the firewall. This is encased in a steel sleeve or casing to prevent tampering with the rod or other parts of the linkage. Preferably, the locking arm is welded onto the brake pedal lever but it can be secured by other, relatively permanent means. For example, the lock arm and brake pedal lever can be unitarily formed.

The lock cylinder, linkage, and locking mechanism are positioned high above the floor, and are not readily visible to a person at the operator or passenger position. Moreover, the area where this mechanism is situated is alongside the steering column, and there is very little room available for a thief to apply a crow bar or other tool to the mechanism.

When the device is employed, the brakes are continuously applied on all four wheels, and cannot be released except by turning the key. If the car is placed in gear, it cannot be driven. The car cannot be towed, except by also using dollies. This makes it enormously troublesome even for a professional thief. A switch inside the lock mechanism is connected in series with the ignition switch and disables the ignition when the device is in the lock or on condition. This leads from the switch pass through the firewall and are not accessible from inside the operators compartment.

The above and many other objects, features, and advantages of this invention will be more fully understood from the ensuing description of a preferred embodiment which should be read in connection with the accompanying Drawing.

DETAILED DESCRIPTION OF A PREFERRED EMBODIMENT

Figure 1:
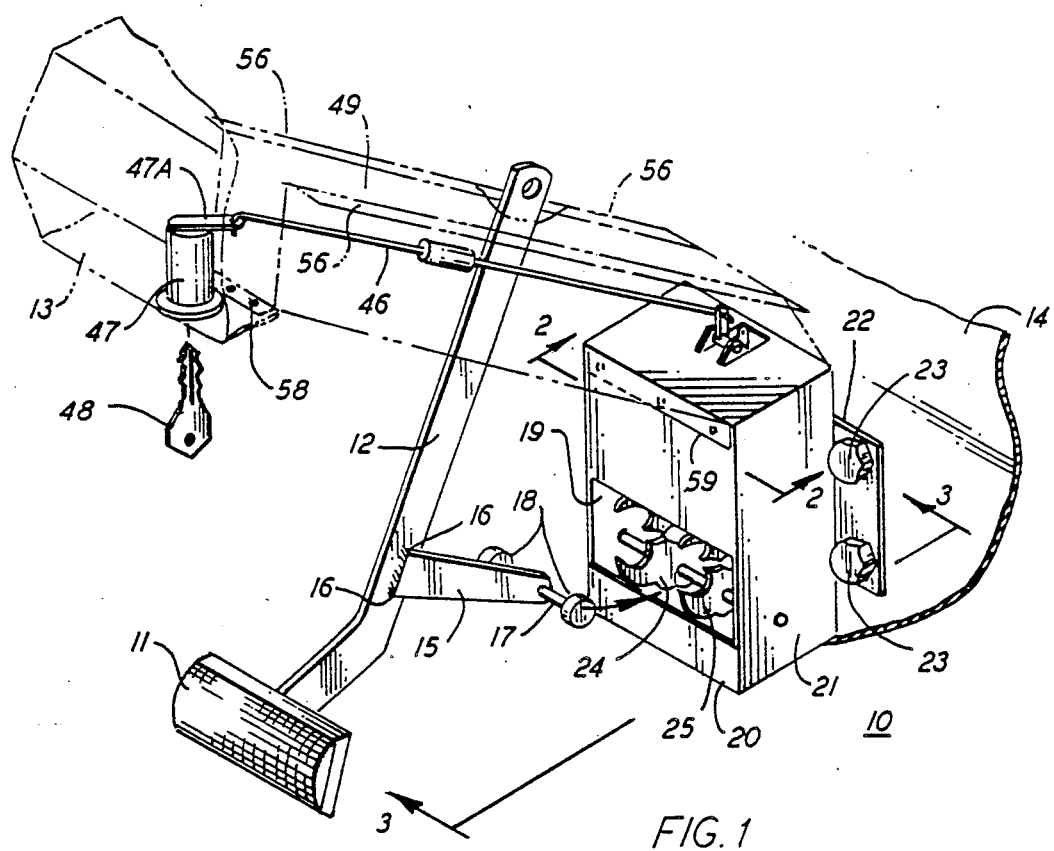
FIG. 1 is a perspective view of an automotive brake locking system according to one preferred embodiment of this invention.

With reference to the Drawing, and initially to FIG. 1, an anti-theft lock assembly 10 according to this invention is shown in place in an automobile in association with a brake pedal 11 having a brake lever 12. A portion of a front dash 13 is shown ahead of the lever 12 and a portion of the firewall 14 is shown behind the lever 11 and separating the operator's compartment from the engine compartment. The lever 11 is pivoted from between the firewall and the dash. While not shown, a brake master cylinder is actuated by the brake lever.

A locking bar 15 is permanently attached, e.g. by welding onto the lever 12. In this case, there are two weld beads 16, which render the attachment permanent. At the free end of the bar 15 a pair of posts 17 project laterally, i.e. to the left and to the right, and carry buttons 18 and their ends.

When the brake pedal 11 is depressed fully, the end of the locking bar 15 enters an opening 19 in a lock mechanism 20 that is attached to the fire wall 14 behind the brake lever 12. This mechanism 20 has a box or enclosure 21 formed of heavy duty steel with attachment ears 22 that extend from its sides. The ears in this case are attached to the firewall 14 by bolts 23, which are secured on the engine side by nylon locking nuts. The ears 21 could instead be tack welded to the firewall.

Figure 3:
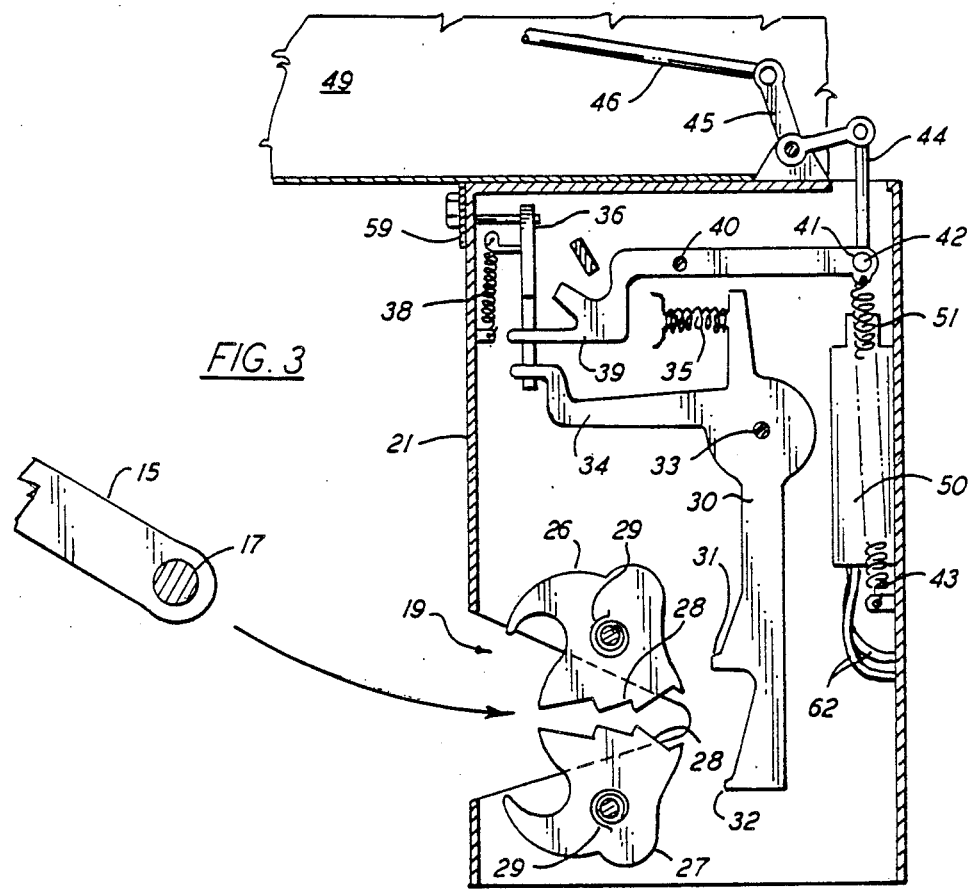
FIG. 3 is a side elevation of the mechanism taken along lines 3—3 of FIG. 1, with the mechanism shown in the unlock or "off" position.
Figure 4:
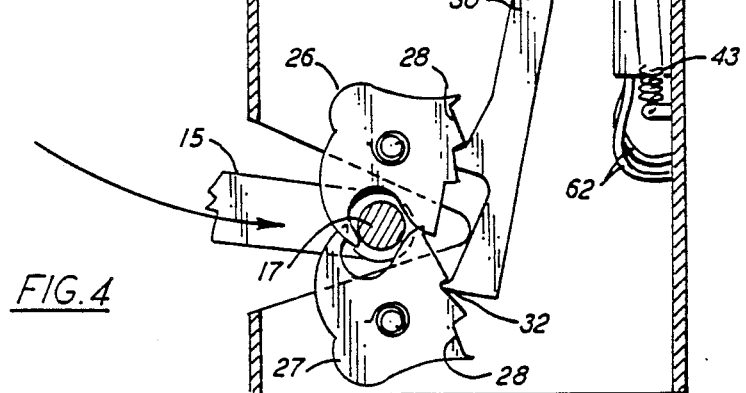
FIG. 4 is a sectional elevation similar to FIG. 3 but showing the mechanism in the lock or "on" position.

As seen through the opening 19, there are a left locking jaw assembly 24 and a right locking jaw assembly 25 which respectively latch on the left and right posts 17. As shown in FIGS. 3 and 4, each of the locking jaw assemblies has an upper spring loaded locking jaw member 26 rotatably mounted above the opening 19 and a lower spring loaded jaw member 27, rotatably mounted below the opening each in the form of an eagle-head ratchet jaw, and each with a rotary ratchet section 28 and an associated rotary spring 29. The upper and lower jaw members 26, 27 capture the locking bar posts 17 from above and from below.

Figure 2:
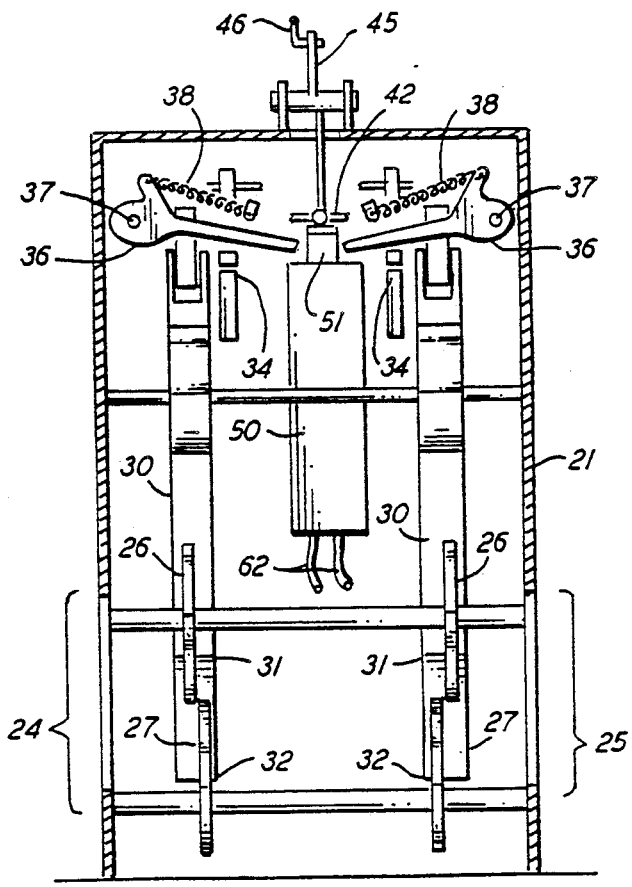
FIG. 2 is a sectional elevation taken along 2—2 of FIG. 1.

Associated with each of the jaw assemblies, there is a ratchet lever 30 which carries an upper ratchet pawl 31 and a lower ratchet pawl 32 which engage the ratchet sections 28 of the upper and lower jaw members 26 and 27. The levers 30 each swing about a pivot 33 and each have an actuator arm 34. A compression spring 35 biases each of the ratchet levers 30 to rotate in the direction of engagement of the pawls 31 and 32 with the ratchet sections 28. A pair of pivot bars 36, better shown in FIG. 2, are provided for moving each of the left and right actuator arms 34. These are each mounted on a respective longitudinal pivot 37 and are urged downward by associated springs 38.

For each of the left and right pivot bars 36, an associated actuator bar 39 rotates on a pivot 40 to raise and lower the pivot bar 36. At a second end 41 of each of the actuator bars 39 there is attached a transverse linkage bar 42, with springs 43 which urge the ends 41 of the actuator bars 39 downwards. A rod 44 that is fused to the transverse linkage bar 42 reaches up to an actuator pivot member 45 that rocks between two positions, namely the unlock or off position shown in FIG. 3 and the lock or on position shown in FIG. 4. This pivot member 45 is connected by a rigid lock rod 46 or bar to a lock cylinder 47, shown in FIG. 1. The rod is of high tempured steel so that it cannot be cut easily. The lock cylinder 47 is mounted on a horizontal surface on an underside of the dash 13. Preferably, the cylinder is mounted into a recess in the undersurface, to reduce the possibility of access to the cylinder by means of burglary tools.

The cylinder 47 is key lockable in either of two positions, 90 degrees apart, which correspond to the on and off positions shown in FIGS. 3 and 4. Preferably, the lock cylinder 47 employs a key 48 of the two-way or double-edge type so that the key can be inserted more easily. Also, because this type of lock cylinder has a double set of pins, there is an additional security factor. The lock cylinder 47 has an L-shaped bracket 47A. Because the bracket is one piece with the lock cylinder, it cannot be manipulated by driving or pulling the cylinder 47 out, as is done by automotive thiefs on door locks and ignition locks. The double set of pins in the cylinder makes the cylinder impossible to be forced to rotate.

Figure 5:
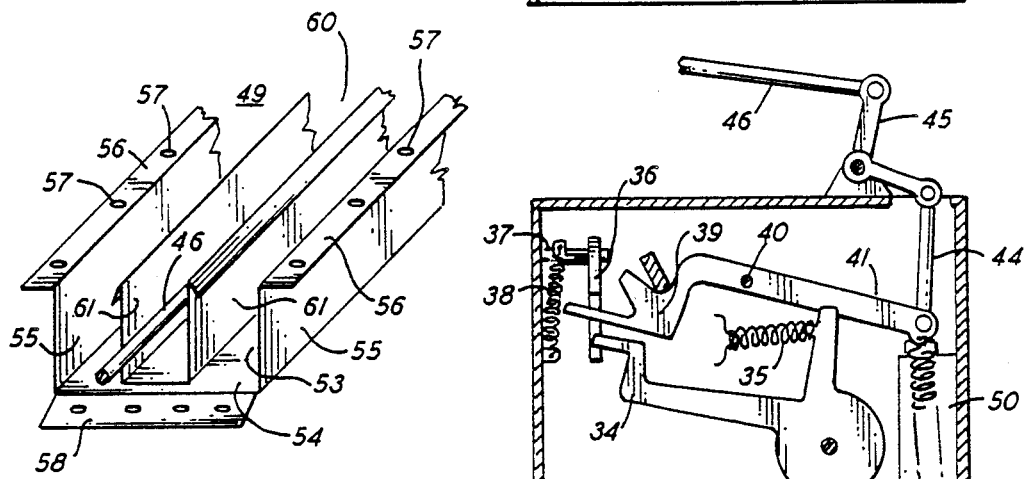
FIG. 5 is a partial perspective view of the protective casing of the system of this embodiment.

The lock cylinder 47 and the rod 46 are protected by a casing or cover 49 of durable sheet metal. This is shown in part in FIG. 5. This casing 49 may be pop-riveted or tack-welded in place and can be bolted or connected by sheet metal screws to an underside of the dash. An adjustment nut 52 is shown in FIG. 1 in association with the lock rod 46. This is employed on initial installation for establishing the length of the lock rod 46 for smooth movement. As shown in FIG. 5, the casing 49 preferably has outer and inner layers with an outer channel 53 formed of a sheet metal floor 54, side walls 55 and side flanges 56. Pop rivets or sheet metal screws fit into openings 57 in the side flanges. There is a front lip 58 that attaches to the dash 13 by screws or pop rivets. One of the side walls 55 is bent in over a portion of its length to provide clearance from the brake pedal lever 12. Another lip 59 at the far end attaches onto the steel enclosure 21. Within the outer channel member is an inner channel member 60 which has side walls 61 between which the rod 46 is positioned. These side walls 61 protect the rod 46 in the event that an intruder cuts through the outer side walls 55.

For normal operation, the lock cylinder is turned to the "on" or unlocked position, and the parts of the lock mechanism are moved to the positions indicated in FIG. 3. In this condition, the pawls 31 and 32 of the ratchet levers 30 are held away from the upper and lower jaw member 26 and 27 of each locking jaw assembly 24 and 25. In this condition, when the brakes are applied, the locking bar 15 will enter the opening 19, but the jaw members 26 and 27 will not latch over the posts 17.

When the car is to be parked and left, the key 48 is turned to place the lock cylinder 47 into the "on" or lock position. This places the parts of the mechanism into the position shown in FIG. 4. In this condition, when the brake pedal lever is fully depressed, the upper and lower jaw members 26 and 27 latch over the posts 17 and are held in this position by action of the ratchet lever pawls 31 and 32 on the ratchet sections 28. The brake pedal lever 12 is held down in the fully depressed position until the key 48 is inserted into the lock cylinder and rotated back to the off or unlocked position. This unlocking step moves the ratchet levers 30 to the position shown in FIG. 3 and permits the jaw members 26 and 27 to rotate thus releasing the posts 17 and the brake lever 12.

On many models of automobile, it may be desirable to reconnect the brake light switch to the accessories lead, so that the brake lights will not remain lit unless the ignition key is inserted into the ignition switch and turned to the on position.

Also shown in FIGS. 2-4 is a normally-closed contact switch 50 which has a switch button 51 that is depressed by the linkage bar 42 when the lock mechanism is placed into the lock or "on" position of FIG. 4 to open the switch 50. Turning the key 47 back to the unlock position lifts the bar 42 and returns the switch 50 to its closed condition. This switch 50 can be connected in line with the ignition circuit of the automobile, so that the ignition is disabled when the lock mechanism is in its lock position. Here the switch has leads 62 that pass through the firewall into the engine compartment. This means that the leads 62 are not exposed inside the operator's compartment, and cannot be bypassed except from inside the engine compartment.

It is preferred that all of the elements within the enclosure 21 of the lock mechanism 20 be given a flat black finish to reduce visibility and help resist manipulation by an intruder.

While this invention has been described in detail with respect to one preferred embodiment, it should be understood that many modifications and variations would present themselves to those with skill in the art without departure from the scope and spirit of this invention.

What is claimed is:

1. An automotive anti-theft device which holds the brakes of a vehicle locked when the vehicle is parked but does not interfere with operation of the brakes when the vehicle is in operation, wherein the vehicle has a firewall that separates an operator's compartment from an engine compartment of the vehicle, a front dash in said operator's compartment and spaced from said firewall, a brake pedal lever pivoted from behind said dash and which is depressed towards the firewall to engage the brakes, the anti-theft device comprising a locking bar affixed onto said brake pedal lever and extending towards said firewall and having a locking member protruding laterally from a said locking bar at a distal end thereof; a locking mechanism affixed onto said firewall to strike said locking bar when said brake pedal lever is depressed, and including a heavy duty enclosure having a passage to admit the distal end of said locking bar, at least one locking jaw rotatably mounted within said enclosure and positioned to engage and capture said locking member of said locking bar, ratchet means selectively actuable between open and closed positions, in said open position, permitting said locking jaw to rotate freely and in said closed position latching said locking jaw in a lock position capturing said locking member when said brake pedal lever is fully depressed; a lock cylinder mounted in said dash and key-lockable in first and second positions that correspond to said open and closed positions of said locking mechanism; linkage means mechanically connecting said lock cylinder and said lock mechanism ratchet means for actuating said ratchet means to its open and closed positions when said lock cylinder is moved to its first and second positions, respectively; and a casing disposed over said linkage means between said cylinder and locking mechanism to prevent tampering with said linkage means.

2. An automotive anti-theft device according to claim 1 wherein said locking bar is welded to said brake pedal lever.

3. An automotive anti-theft device according to claim 1 wherein said locking bar is unitarily formed with said brake pedal lever.

4. An automotive anti-theft device according to claim 1 wherein said locking member includes a pair of posts that protrude laterally from opposite sides of said locking bar, and said locking mechanism has a plurality of said locking jaws positioned to engage each of said posts when said brake pedal lever is depressed.

5. An automotive anti-theft device according to claim 4 wherein there are four of said locking jaws, a left pair rotatably mounted on the left and a right pair rotatably mounted on the right of the locking mechanism, one of each pair of locking jaws rotatably mounted above said passage and the other of each pair rotatably mounted below said passage to capture each of said posts from above and below.

6. An automotive anti-theft device according to claim 1 wherein said linkage means includes a rigid bar connecting said lock cylinder to said locking mechanism.

7. An automotive anti-theft device according to claim 1 wherein said locking bar, each said at least one locking jaw, and said ratchet means are all painted a flat black to reduce visibility and resist manipulation by an intruder.

8. An automotive anti-theft device according to claim 1 wherein said locking cylinder is mounted on a horizontal surface on an underside of said front dash.

9. An automotive anti-theft device according to claim 8 wherein said locking cylinder is recessed at least slightly above said horizontal surface.

10. An automotive anti-theft device according to claim 8 wherein said cylinder is of the double-pin type and employs a key of the double-edge type.

11. An automotive anti-theft device according to claim 1, wherein said lock mechanism includes an electrical switch which closes when said ratchet means is in the open position and opens when said ratchet means is in the closed position, and connected in series with an ignition circuit for the vehicle, so that the vehicle ignition circuit is disabled when the lock mechanism is in its closed position.

* * * * *